United States Patent Office 3,221,371
Patented Dec. 7, 1965

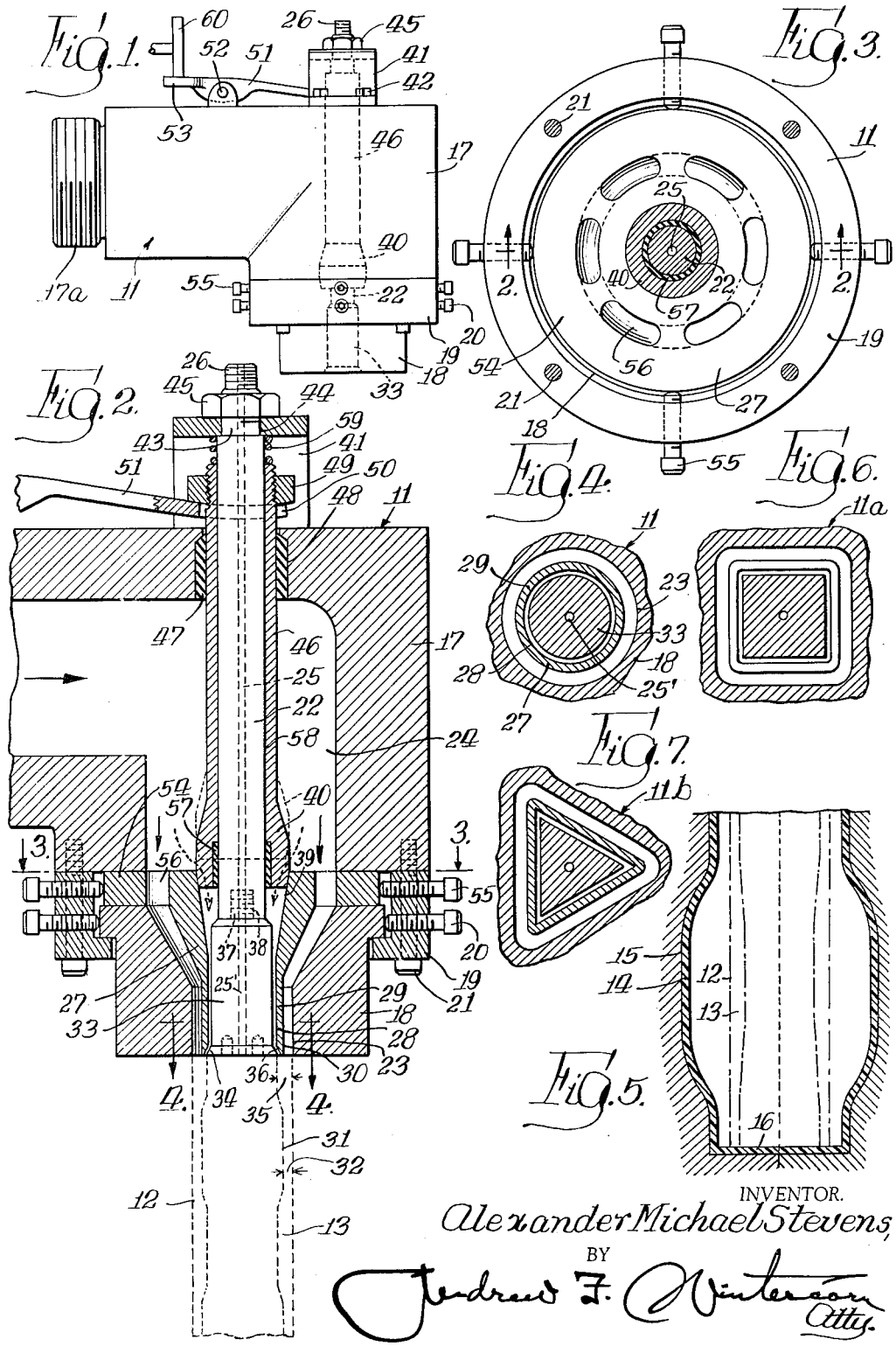

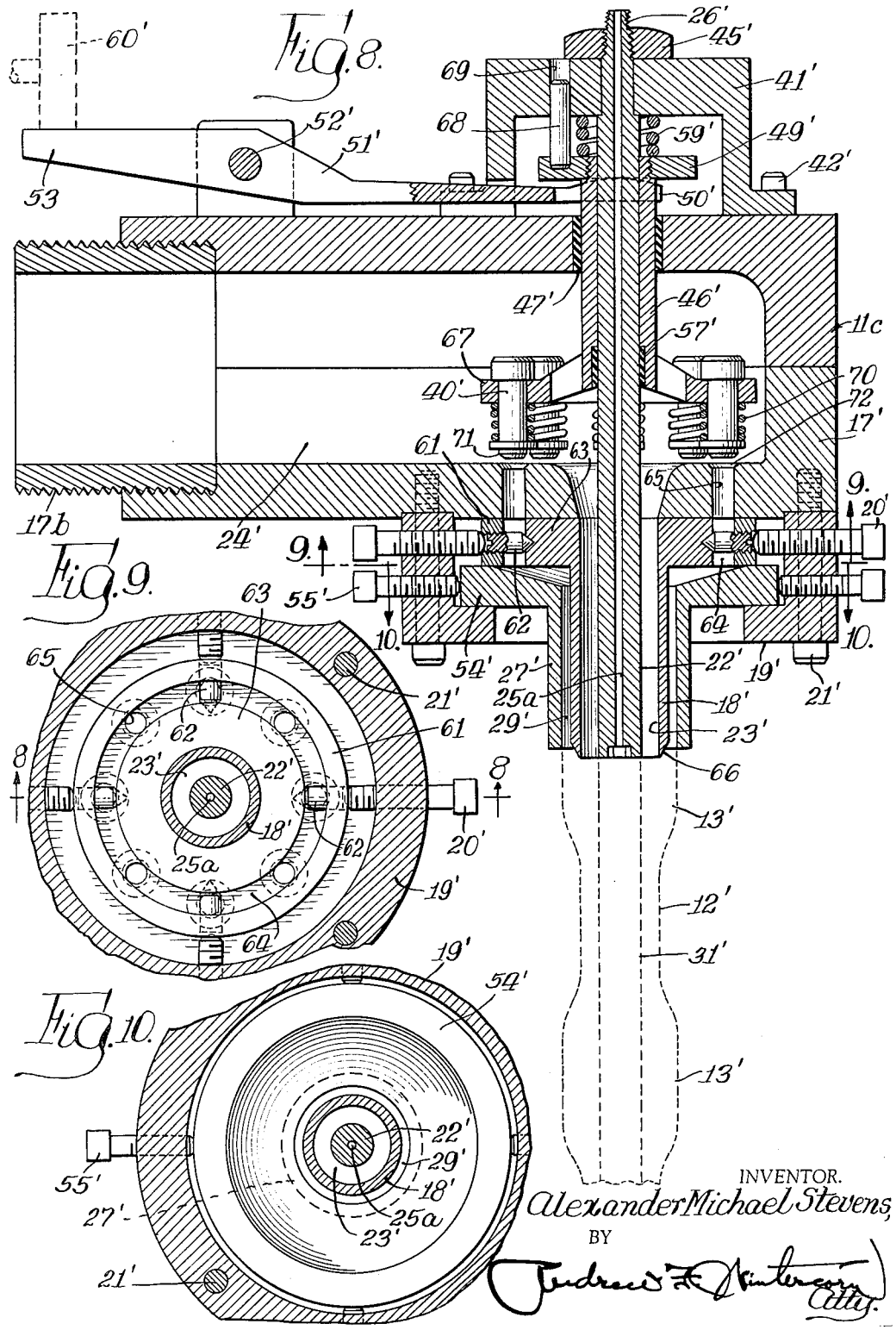

1

3,221,371
EXTRUDING DIES
Alexander Michael Stevens, 439 Greenbay Road,
Highland Park, Ill.
Filed Mar. 25, 1963, Ser. No. 267,659
9 Claims. (Cl. 18—14)

This invention relates to extruding dies especially designed and adapted for the extrusion of plastic tubes or parasins of varying or pulsating diameter, internally or externally, the variation in wall thickness while the material is still flowable immediately after extrusion being desirable from the standpoint that a hollow object molded by ballooning out the parasin under pneumatic pressure inside a sectional mold makes possible a substantially uniform wall thickness in the ultimate hollow molded product, regardless of how far out the wall has to be blown to meet the wall of the mold cavity.

The principal object of my invention is to provide extruding dies so constructed that there is virtually no limit to the cross-sectional shapes of extruded pulsated parasins, having variations in I.D. or O.D.—oval, round, square, triangular, hexagonal, etc.

The invention is illustrated in the accompanying drawings, in which:

FIG. 1 is a side view of an extruding die made in accordance with my invention;

FIG. 2 is a vertical section on the line 2—2 of FIG. 3 on a slightly larger scale than FIG. 1;

FIG. 3 is a horizontal section on line 3—3 of FIG. 2;

FIG. 4 is a horizontal section detail on the line 4—4 of FIG. 2;

FIG. 5 is a section through a mold cavity indicating a parasin in dotted lines as extruded and showing in section that the hollow molded article produced from the parasin by ballooning out to the walls of the mold cavity has a substantially uniform wall thickness by virtue of the variation in wall thickness of the parasin;

FIGS. 6 and 7 are views similar to FIG. 4 showing other shapes that can be extruded in a similar way with variations in I.D., similarly as the round section;

FIG. 8 is a vertical section on the line 8—8 of FIG. 9 showing a modified or alternative construction of extruding die for the extrusion of pulsated parasins having variations in O.D. and FIGS. 9 and 10 are horizontal sections on the correspondingly numbered lines of FIG. 8.

Similar reference numerals are applied to corresponding parts throughout these views.

Referring to the drawings, and first to FIGS. 1 to 5, the reference numeral 11 designates generally an extruding die made in accordance with my invention for extruding plastic tubes or parasins 12 of polyethelene, polystyrene, or other thermo-plastic or thermo-setting material of constant outer diameter (called O.D.) but varying or pulsating internal diameter (or I.D.), the increase in wall thickness indicated at 13 enabling the production of various shaped plastic bottles and other hollow articles, as indicated at 14 in FIG. 5, with a substantially uniform wall thickness, when the parasin is ballooned out under pneumatic pressure to meet the walls of the mold cavity 15, the parasin being, so to speak, tailored by variation in wall thickness to fit the particular needs of any given shape of molded articles that could otherwise not be produced without too much variation in wall thickness with parasins of uniform wall thickness, the added material at 13 giving the necessary fullness, in other words, to fill out the recess in the mold cavity. As the parasins are extruded, their ends are closed in the nipping off of one parasin after another, as is well known in this art, and need not therefore be illustrated. It is also

2 old in the art (and this also need not therefore be illustrated) to provide the equivalent of a hypodermic needle to pierce one closed end of the freshly made parasin for the injection of the air while the material is still flowable immediately after extrusion to inflate the parasin in the mold cavity. A closed end is indicated, for example, at 16 in FIG. 5. While, as shown in FIGS. 3 and 4, the die 11 is constructed to produce parasins of circular cross-section, it should be understood, and will soon be clear, that my invention is not limited to that shape but can be used to produce parasins of many different regular and irregular shaped cross-sections, such as oval, square, triangular, rectangular, hexagonal, octagonal, and so forth. Thus, a die 11a for production of square parasins is shown in FIG. 6, and a die 11b for production of triangular parasins is shown in FIG. 7. No need can be seen for further illustrations along those lines.

Continuing about FIGS. 1 to 4, the die 11 in so far as the hollow body 17 is concerned is of conventional design, and the same is true of the shell 18 and its mounting ring 19 with centering screws 20, the ring being bolted to body 17, as shown at 21. In a conventional die a core pin like that illustrated at 22 and of appropriate diameter in relation to the bore and disposed centrally thereof and extending down to the lower end of the bore 23 would serve to define the bore in the parasins as the plastic material flowing under pressure through bore 24 is extruded around and past the pin 22 through bore 23. Air under sufficient pressure only to keep the freshly extruded parasin from collapsing after leaving the die is supplied through passage 25 in pin 22 from a source of air pressure, the air hose being connected at 26. However, in accordance with my invention, there is provided, in addition to the outer shell 18, an inner shell 27 providing another bore 28 in its lower end portion 29, the outside 30 of which serves the same purpose as an extension of the core pin 22 in relation to bore 23, with which it is concentrically arranged, namely, to define the bore 31 of a parasin 12, so long as a constant wall thickness, indicated by dimension 32, is desired. Shell 27 has a slightly enlarged concentric lower end extension 33 of core pin 22 disposed in centered relation to its bore 28 and this extension 33 is flared at its lower end, as at 34, to direct additional plastic material outwardly against the bore 31 to build the wall thickness of the parasin up to that indicated by dimension 35, the lower end of bore 28 being bevelled, as at 36, to match the flare 34, so that a parasin of a predetermined wall thickness can be extruded from the annular orifice at the discharge end of bore 23, but this wall thickness can be increased by extrusion of additional material from the companion annular orifice at the discharge end of bore 28. Different diameters of extensions 33 can be used, depending on the amount of increase in wall thickness desired, the extensions having reduced threaded upper ends 37 threaded interchangeably in an enlarged lower end portion 38 of passage 25. The extensions have central through bores 25′ provided therin to register with passage 25, as shown. The upper end portion 39 of the bore in inner shell 27 is flared, as shown, and serves as a tapered valve seat for the correspondingly tapered end of a tubular plunger valve 40 that is reciprocable on pin 22 and controls the flow of plastic material from bore 24 to bore 29. Pin 22 is held against endwise movement by being supported at its upper end in fixed relation to body 17 on an inverted U-shaped yoke 41 secured at its opposite ends on top of body 17 by bolts 42, the upper end portion 43 of the pin being of reduced diameter and entered in a hole 44 in the yoke and threaded to receive a jamb nut 45 below the further reduced end portion 26 previously mentioned as the place for connecting an air hose. The reduced shank portion 46 of valve 40 is reciprocable in and projects through a rubber or equivalent seal bushing 47 set in a hole 48 provided in the top wall of body 17 and has a nut 49 threaded on the upper end to provide an annular shoulder on its under side for engagement by the forked end 50 of a rocker arm 51 pivoted intermediate its ends, as at 52, on top of body 17 and operable by depression of its other end 53. An annular flange 54 on the upper end of inner shell 27 rests on top of outer shell 18 and has screws 55, like screws 20, associated therewith and adjustable relative to ring 19 to center the inner shell 27 accurately relative to outer shell 18. Arcuate slots 56 provided in flange 54 establish continuous communication for the bore 23 in outer shell 18 with bore 24, so that plastic material for the thin walled portions 32 and thick wall portions 35 of the parasins is continuously being delivered through bore 23. At intervals, additional plastic material to build up to wall thickness 35, is supplied to the bore of the parasin through bore 29 by the opening of valve 40. A rubber or equivalent seal bushing 57 is provided in a counterbore in the lower end of valve 40 to prevent leakage of plastic material into the bore 58 of valve 40. A coiled compression spring 59 caged on pin 22 between yoke 41 and the upper end of the shank 46 of valve 40 tends normally to seat the valve 40, a rotary cam 60 or any other suitable operating means operated in timed relation to the delivery of plastic material being employed to cause the opening of the valve 40 at the correct predetermined time intervals and hold the same open for longer and shorter intervals according to a predetermined pattern of thin and thick wall sections desired. In passing, attention is called to the threaded hollow projection 17a on one end of body 17, that is for connecting the body with an extrusion machine.

The construction of FIGS. 8 to 10 operates in a closely similar way to build up wall thicknesses on parasins 12' at predetermined intervals on the outer diameter or O.D., as seen at 13', these parasins 12' having a bore 31' of constant internal diameter or I.D. The die 11c, in so far as the hollow body 17' is concerned, is of conventional design, and the same is true of shell 18' and core pin 22', the latter being of appropriate diameter in relation to the bore 23' and disposed centrally thereof and extending down to its lower end to define the constant sized bore 31' in the parasins as the plastic material flowing under pressure through bore 24' is extruded around and past the pin 22' through bore 23'. Air under pressure sufficient only to keep the freshly extruded parasin from collapsing after leaving the die is supplied through passage 25a in pin 22' from a source of air pressure, a hose connection being made at 26'. However, in accordance with my invention, this form, having the reverse of the arrangement of shells 18 and 27 previously described, has the main shell 18' as the inner one and the auxiliary shell 27' as the outer one, but both are supported on and centered relative to one another and to body 17' on a ring 19' in a generally similar manner, the reversal in arrangement of shells making it necessary only to provide an additional spacing ring 61 with radially inwardly projecting conically pointed pins 62 to engage in conical recesses in the flange 63 on shell 18' and thereby provide the annular opening 64 through which to establish communication for ports 65 in body 17' with the bore 29' of shell 27' and allow flow of plastic material intermittently from bore 24' into shell 27' to supply the extra plastic material needed to form the thicker portions 13' of the parasins. The bevel 66 on the end of shell 18' facilitates merger of the two streams of plastic material. Ring 61, besides providing the opening 64 and centering shell 18' upon proper adjustment of screws, serves to support the shell 18' against vertical displacement relative to shell 27' by resting on top of the flange 54' of the latter. Screws 55' serve to center the shell 27' relative to shell 18', and screws 21' fasten the mounting ring 19' onto body 17'. Spring cushioned pins 40' are disposed in register with ports 65 and serve to close them when the yoke 67 carrying these pins and guided for reciprocation on pin 22' is allowed to move downwardly under action of spring 59', namely, when the rocker arm 51' is not holding the yoke 67 raised under control of cam 60'. Yoke 67 has its tubular shank 46' slidably mounted for reciprocation on pin 22' and sealed at 57' against entry of plastic material and operable in a rubber or equivalent seal bushing 47', while the jamb nut 49', which is threaded on the reduced threaded upper end of the shank and cooperates with the forked end 50' of the rocker arm to transmit endwise movement to yoke 67 serves also to keep pins 40' in register with ports 65 by holding the yoke against turning, this being accomplished by a pin 68 on the nut being slidable in a hole 69 in the yoke 41'. The latter is secured by bolts 42' at its opposite ends to body 17' and has the upper end of pin 22' secured thereto and also held against endwise movement by means of nut 45'. Spring 59' preferably exerts sufficient pressure to overcome the resistance of all of the eight lighter springs 70 when the pins 40' have their bevelled ends 71 engaged in the bevelled seats 72 provided in ports 65.

The operation of both forms, it is believed, should be clear from the foregoing description. The form and mode of operation illustrated in FIG. 1 is, at least at present, preferred over that illustrated in FIG. 8.

It is believed the foregoing description conveys a good understanding of the objects and advantages of my invention. The appended claims have been drawn to cover all legitimate modifications and adaptations.

I claim:

1. An extruder die structure for use in the extrusion of tubular parasins of plastic material comprising, in combination, a hollow body having an inlet and an outlet for flow of plastic material through the body under pressure, a first tubular parasin extruder shell having a bore in fixed relation to and communicating with the outlet and of a cross-sectional shape to suit the cross-sectional shape of the parasins to be extruded through said bore, a core of complementary cross-sectional shape disposed in fixed centered relation to the outlet end of the bore of said shell to define an annular orifice of a predetermined width for extrusion of a parasin of a predetermined wall thickness, a second tubular parasin extruder shell having a bore of complementary cross-sectional shape in fixed relation to and communicating with the outlet of said body and disposed in fixed centered relation to the core and to the outlet end of the bore of said first shell to define an additional annular orifice arranged to increase the width of the first orifice to permit extrusion therethrough of additional material to build up the wall thickness of a parasin beyond the first mentioned predetermined wall thickness, and means for opening up and closing off communication with said outlet for the bore of one of said shells.

2. An extruder die structure as set forth in claim 1, including means whereby said last mentioned means is operated at intervals in timed relation to the discharge of the plastic material from said outlet, whereby to space the added plastic material in a predetermined way in relation to the length of the parasin being extruded.

3. An extruder die structure as set forth in claim 1, including means where said last mentioned means is operated at intervals and the operation is of longer or shorter duration in timed relation to the discharge of the plastic material from said outlet, whereby to space the added plastic material in a predetermined way in relation to the length of the parasin being extruded.

4. An extruder die structure as set forth in claim 1, including an air passage provided lengthwise of said core for delivery of compressed air to the interior of a parasin during extrusion in sufficient amount to prevent collapse of the freshly extruded parasins.

5. An extruder die structure as set forth in claim 1 wherein the second shell is inside the first shell and the shutoff and opening up of communication with said outlet is for the bore of the second shell.

6. An extruder die structure as set forth in claim 1 wherein the second shell is outside the first shell and the shutoff and opening up of communication with said outlet is for the bore of the second shell.

7. An extruder die structure for use in the extrusion of tubular parasins of plastic material comprising, in combination, a hollow body having an inlet and an outlet for flow of plastic material through the body under pressure, a first tubular parasin extruder shell having a bore in fixed relation to and communicating with the outlet and of a cross-sectional shape to suit the cross-sectional shape of the parasins to be extruded through said bore, a core of complementary cross-sectional shape disposed in fixed centered relation to the outlet end of the bore of said shell, said core having an elongated shank portion behind said outlet and extending from said body through an opening provided in the wall thereof, a second tubular parasin extruder shell having a bore of complementary cross-sectional shape in fixed relation to and communicating with the outlet of said body and disposed in fixed centered relation to the core and to the outlet end of the bore of said first shell, and means for controlling communication with said outlet for the bore of one of said shells, said means comprising a tubular member slidably guided on the shank portion of said core and also extending from said body through the same aforesaid opening, valve means on one end of said tubular member controlling the communication between said outlet and said shell, and means connected with the other end of said tubular member for its reciprocation to and from closed position.

8. An extruder die structure as set forth in claim 7, wherein the last mentioned means comprises spring means urging said tubular member in one direction to closed position, a rocker element rockably mounted relative to said body having one end pivotally connected with the outer end of said tubular member, and means at the other end of said rocker element for intermittently rocking the same against resistance of said spring means.

9. An extruder die structure as set forth in claim 1, wherein said core is of two-piece construction, namely, a supporting shank and an elongated end piece detachably secured at one end to said shank and conformed in cross-section to match the cross-sectional shape of the bore in the shell, the cross-sectional dimensions of said end piece being determined according to the clearance space desired around it in the bore of the shell in which it is to be disposed and the thickness of the stream of plastic material to be extruded, the end piece being removable to permit application of a larger or smaller size end piece onto said shank.

References Cited by the Examiner
UNITED STATES PATENTS

| | | | |
|---|---|---|---|
| 1,381,071 | 6/1921 | Flannery | 150—.5 |
| 2,592,658 | 4/1952 | Colombo | 18—14 |
| 2,706,308 | 4/1955 | Lorenz | 18—5 |
| 3,051,990 | 9/1962 | Peterson | 18—14 |
| 3,059,277 | 10/1962 | Pierce et al. | 18—14 |
| 3,070,841 | 1/1963 | Schornstheimer | 18—55 |
| 3,081,002 | 3/1963 | Tauschinski et al. | 150—.5 |
| 3,089,187 | 5/1963 | Wolfe | 18—55 |

WILLIAM J. STEPHENSON, *Primary Examiner.*

FRANKLIN T. GARRETT, *Examiner.*